United States Patent
Verfuerth et al.

(10) Patent No.: US 9,521,726 B2
(45) Date of Patent: Dec. 13, 2016

(54) LIGHTING SYSTEMS AND METHODS FOR DISPLACING ENERGY CONSUMPTION USING NATURAL LIGHTING FIXTURES

(71) Applicant: Orion Energy Systems, Inc., Manitowoc, WI (US)

(72) Inventors: Neal R. Verfuerth, Manitowoc, WI (US); Michael J. Potts, Plymouth, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 10 days.

(21) Appl. No.: 14/537,675

(22) Filed: Nov. 10, 2014

(65) Prior Publication Data

US 2015/0061507 A1    Mar. 5, 2015

Related U.S. Application Data

(63) Continuation of application No. 13/371,249, filed on Feb. 10, 2012, now Pat. No. 8,884,203, which is a
(Continued)

(51) Int. Cl.
| | |
|---|---|
| *G01J 1/32* | (2006.01) |
| *G05D 3/12* | (2006.01) |
| *H05B 37/02* | (2006.01) |

(52) U.S. Cl.
CPC ...... *H05B 37/0218* (2013.01); *H05B 37/0272* (2013.01); *H05B 37/0281* (2013.01); *Y02B 20/42* (2013.01)

(58) Field of Classification Search
CPC .......................... H05B 37/021; H05B 37/0245
(Continued)

(56) References Cited

U.S. PATENT DOCUMENTS

| | | | |
|---|---|---|---|
| 1,254,520 | A | 1/1918 | Macduff |
| 2,403,240 | A | 7/1946 | Sawin |

(Continued)

FOREIGN PATENT DOCUMENTS

| | | |
|---|---|---|
| GB | 2 237 826 | 5/1991 |
| GB | 2 250 172 | 6/1992 |

(Continued)

OTHER PUBLICATIONS

"About Sun Dome Tubular Skylights," having a date indication of © 2009, 8 pages.
(Continued)

*Primary Examiner* — Thanh Lulu
(74) *Attorney, Agent, or Firm* — Foley & Lardner LLP

(57) ABSTRACT

A lighting system for displacing energy is provided. The lighting system includes a light sensor to measure an amount of light provided from the natural lighting fixture to a building environment. The lighting system further includes processing electronics to receive information from the light sensor and to use the received information to determine when the amount of light provided from the natural lighting fixture is sufficient to allow one or more electric lighting fixtures to be turned off or dimmed, the processing electronics causing the one or more electric lighting fixtures to turn off or dim in response to the determination. The processing electronics are further configured to calculate the energy saved from turning off or dimming the one or more lighting fixtures. The lighting system further includes a communications interface configured to transmit the results of the calculation of energy saved from the processing electronics to a second party.

19 Claims, 7 Drawing Sheets

Related U.S. Application Data continuation-in-part of application No. 11/744,083, filed on May 3, 2007, now Pat. No. 8,626,643, and a continuation-in-part of application No. 11/771,317, filed on Jun. 29, 2007, now Pat. No. 7,638,743, and a continuation-in-part of application No. 12/550,270, filed on Aug. 28, 2009, now Pat. No. 8,450,670, which is a continuation-in-part of application No. 12/240,805, filed on Sep. 29, 2008, now Pat. No. 8,344,665, which is a continuation-in-part of application No. 12/057,217, filed on Mar. 27, 2008, now Pat. No. 8,406,937, said application No. 13/371,249 is a continuation-in-part of application No. 12/559,240, filed on Sep. 14, 2009, now Pat. No. 8,376,600, which is a continuation-in-part of application No. 11/771,317, filed on Jun. 29, 2007, now Pat. No. 7,638,743.

(58) Field of Classification Search
USPC .................................. 250/205; 700/295, 296
See application file for complete search history.

(56) References Cited

U.S. PATENT DOCUMENTS

| | | |
|---|---|---|
| 2,485,148 A | 10/1949 | Fralin |
| 2,636,977 A | 4/1953 | Foster |
| 3,292,319 A | 12/1966 | McCarthy |
| 3,337,035 A | 8/1967 | Pennybacker |
| 3,416,266 A | 12/1968 | Eron |
| 3,511,559 A | 5/1970 | Foster |
| 3,757,290 A | 9/1973 | Ross et al. |
| 4,013,922 A | 3/1977 | Van Der Meulen |
| 4,023,043 A | 5/1977 | Stevenson |
| 4,114,186 A | 9/1978 | Dominguez |
| 4,135,181 A | 1/1979 | Bogacki et al. |
| 4,144,462 A | 3/1979 | Sieron et al. |
| 4,190,800 A | 2/1980 | Kelly et al. |
| 4,204,194 A | 5/1980 | Bogacki |
| 4,204,195 A | 5/1980 | Bogacki |
| 4,306,769 A | 12/1981 | Martinet |
| 4,360,881 A | 11/1982 | Martinson |
| 4,387,417 A | 6/1983 | Plemmons et al. |
| 4,489,386 A | 12/1984 | Breddan |
| 4,727,593 A | 2/1988 | Goldstein |
| 4,733,505 A | 3/1988 | Van Dame |
| 4,809,468 A | 3/1989 | Bareiss |
| 4,841,914 A | 6/1989 | Chattan |
| 4,860,511 A | 8/1989 | Weisner et al. |
| 4,883,340 A | 11/1989 | Dominguez |
| 4,998,095 A | 3/1991 | Shields |
| 5,099,622 A | 3/1992 | Sutton |
| 5,165,465 A | 11/1992 | Kenet |
| 5,253,444 A | 10/1993 | Donoho et al. |
| 5,261,179 A | 11/1993 | Schwinler |
| 5,353,543 A | 10/1994 | Teraoka |
| 5,371,661 A | 12/1994 | Simpson |
| 5,426,620 A | 6/1995 | Budney |
| 5,546,712 A | 8/1996 | Bixby |
| 5,572,438 A | 11/1996 | Ehlers et al. |
| 5,598,042 A | 1/1997 | Mix et al. |
| 5,644,173 A | 7/1997 | Elliason et al. |
| 5,649,394 A | 7/1997 | Ohba |
| 5,655,339 A | 8/1997 | DeBlock et al. |
| 5,713,160 A | 2/1998 | Heron |
| 5,717,609 A | 2/1998 | Packa et al. |
| 5,729,387 A | 3/1998 | Takahashi et al. |
| 5,758,331 A | 5/1998 | Johnson |
| 5,836,114 A | 11/1998 | Ohba |
| 5,918,404 A | 7/1999 | Ohba |
| 5,956,462 A | 9/1999 | Langford |
| 5,962,989 A | 10/1999 | Baker |
| 6,003,471 A | 12/1999 | Ohba |
| 6,122,603 A | 9/2000 | Budike, Jr. |
| 6,169,979 B1 | 1/2001 | Johnson |
| 6,257,735 B1 | 7/2001 | Baar |
| D447,266 S | 8/2001 | Verfuerth |
| 6,363,667 B2 | 4/2002 | O'Neill |
| 6,367,419 B1 | 4/2002 | Gosselin |
| 6,418,674 B1 | 7/2002 | Deraedt |
| D463,059 S | 9/2002 | Verfuerth |
| 6,467,933 B2 | 10/2002 | Baar |
| 6,524,175 B2 | 2/2003 | Beaudry et al. |
| 6,528,782 B1 | 3/2003 | Zhang et al. |
| 6,528,957 B1 | 3/2003 | Luchaco |
| 6,535,859 B1 | 3/2003 | Yablonowski et al. |
| 6,585,396 B1 | 7/2003 | Verfuerth |
| D479,826 S | 9/2003 | Verfuerth et al. |
| 6,622,097 B2 | 9/2003 | Hunter |
| 6,633,823 B2 | 10/2003 | Bartone et al. |
| 6,644,836 B1 | 11/2003 | Adams |
| D483,332 S | 12/2003 | Verfuerth |
| 6,671,586 B2 | 12/2003 | Davis et al. |
| 6,717,660 B1 | 4/2004 | Bernardo |
| 6,731,080 B2 | 5/2004 | Flory |
| D494,700 S | 8/2004 | Hartman et al. |
| 6,774,790 B1 | 8/2004 | Houston |
| 6,785,592 B1 | 8/2004 | Smith et al. |
| 6,813,864 B2 | 11/2004 | Landis |
| 6,828,695 B1 | 12/2004 | Hansen |
| 6,832,135 B2 | 12/2004 | Ying |
| 6,894,609 B2 | 5/2005 | Menard et al. |
| 6,938,210 B1 | 8/2005 | Huh |
| 6,979,097 B2 | 12/2005 | Elam et al. |
| 6,983,210 B2 | 1/2006 | Matsubayashi et al. |
| 6,990,394 B2 | 1/2006 | Pasternak |
| 7,027,736 B1 | 4/2006 | Mier-Langner et al. |
| 7,130,719 B2 | 10/2006 | Ehlers et al. |
| 7,130,832 B2 | 10/2006 | Bannai et al. |
| 7,167,777 B2 | 1/2007 | Budike, Jr. |
| 7,259,527 B2 | 8/2007 | Foo |
| 7,264,177 B2 | 9/2007 | Buck et al. |
| D557,817 S | 12/2007 | Verfuerth |
| 7,307,542 B1 | 12/2007 | Chandler et al. |
| D560,469 S | 1/2008 | Bartol et al. |
| 7,369,056 B2 | 5/2008 | McCollough, Jr. |
| 7,401,942 B1 | 7/2008 | Verfuerth et al. |
| 7,446,671 B2 | 11/2008 | Giannopoulos et al. |
| 7,518,531 B2 | 4/2009 | Butzer et al. |
| D595,894 S | 7/2009 | Verfuerth et al. |
| 7,563,006 B1 | 7/2009 | Verfuerth et al. |
| 7,575,338 B1 | 8/2009 | Verfuerth |
| D606,697 S | 12/2009 | Verfuerth et al. |
| 7,628,506 B2 | 12/2009 | Verfuerth et al. |
| 7,638,743 B2 | 12/2009 | Bartol et al. |
| 7,660,652 B2 | 2/2010 | Smith et al. |
| D617,028 S | 6/2010 | Verfuerth et al. |
| D617,029 S | 6/2010 | Verfuerth et al. |
| 7,738,999 B2 | 6/2010 | Petite |
| 7,746,003 B2 | 6/2010 | Verfuerth et al. |
| 7,762,861 B2 | 7/2010 | Verfuerth et al. |
| D621,410 S | 8/2010 | Verfuerth et al. |
| D621,411 S | 8/2010 | Verfuerth et al. |
| 7,780,310 B2 | 8/2010 | Verfuerth et al. |
| 7,784,966 B2 | 8/2010 | Verfuerth et al. |
| D623,340 S | 9/2010 | Verfuerth et al. |
| 7,812,543 B2 | 10/2010 | Budike, Jr. |
| 7,847,706 B1 | 12/2010 | Ross et al. |
| 7,859,398 B2 | 12/2010 | Davidson et al. |
| D632,006 S | 2/2011 | Verfuerth et al. |
| 8,033,686 B2 | 10/2011 | Recker et al. |
| 8,035,320 B2 * | 10/2011 | Sibert ............ H05B 37/0245 315/149 |
| D650,225 S | 12/2011 | Bartol et al. |
| 8,070,312 B2 | 12/2011 | Verfuerth et al. |
| 8,138,690 B2 | 3/2012 | Chemel et al. |
| 8,255,090 B2 | 8/2012 | Frader-Thompson et al. |
| 8,344,665 B2 | 1/2013 | Verfuerth et al. |
| 8,373,362 B2 | 2/2013 | Chemel et al. |
| 8,376,600 B2 | 2/2013 | Bartol et al. |
| 8,450,670 B2 | 5/2013 | Verfuerth et al. |
| 8,531,134 B2 | 9/2013 | Chemel et al. |
| 8,543,249 B2 | 9/2013 | Chemel et al. |

(56) References Cited

U.S. PATENT DOCUMENTS

| | | |
|---|---|---|
| 8,610,377 B2 | 12/2013 | Chemel et al. |
| 8,626,643 B2 | 1/2014 | Verfuerth et al. |
| 8,884,203 B2* | 11/2014 | Verfuerth ........... H05B 37/0272 250/205 |
| 2001/0055965 A1 | 12/2001 | Delp et al. |
| 2002/0060283 A1* | 5/2002 | Jordan ................ H05B 39/042 250/205 |
| 2002/0065583 A1 | 5/2002 | Okada et al. |
| 2002/0082748 A1 | 6/2002 | Enga et al. |
| 2002/0103655 A1 | 8/2002 | Boies et al. |
| 2002/0162032 A1 | 10/2002 | Gundersen et al. |
| 2002/0172049 A1 | 11/2002 | Yueh |
| 2002/0173321 A1 | 11/2002 | Marsden et al. |
| 2003/0011486 A1 | 1/2003 | Ying |
| 2003/0016143 A1 | 1/2003 | Ghazarian |
| 2003/0036820 A1 | 2/2003 | Yellepeddy et al. |
| 2003/0041017 A1 | 2/2003 | Spool et al. |
| 2003/0041038 A1 | 2/2003 | Spool et al. |
| 2003/0046252 A1 | 3/2003 | Spool et al. |
| 2003/0084358 A1 | 5/2003 | Bresniker et al. |
| 2003/0084359 A1 | 5/2003 | Bresniker et al. |
| 2003/0093332 A1 | 5/2003 | Spool et al. |
| 2003/0171851 A1 | 9/2003 | Brickfield et al. |
| 2003/0179577 A1 | 9/2003 | Marsh |
| 2003/0229572 A1 | 12/2003 | Raines et al. |
| 2004/0006439 A1 | 1/2004 | Hunter |
| 2004/0024483 A1 | 2/2004 | Holcombe |
| 2004/0076001 A1 | 4/2004 | Lutes |
| 2004/0078153 A1 | 4/2004 | Bartone et al. |
| 2004/0078154 A1 | 4/2004 | Hunter |
| 2004/0083163 A1 | 4/2004 | Cooper |
| 2004/0095237 A1 | 5/2004 | Chen et al. |
| 2004/0128266 A1 | 7/2004 | Yellepeddy et al. |
| 2004/0193329 A1 | 9/2004 | Ransom et al. |
| 2004/0201448 A1 | 10/2004 | Wang |
| 2004/0243377 A1 | 12/2004 | Roytelman |
| 2005/0027636 A1 | 2/2005 | Gilbert et al. |
| 2005/0034023 A1 | 2/2005 | Maturana et al. |
| 2005/0035717 A1 | 2/2005 | Adamson et al. |
| 2005/0038571 A1 | 2/2005 | Brickfield et al. |
| 2005/0043860 A1 | 2/2005 | Petite |
| 2005/0124346 A1 | 6/2005 | Corbett et al. |
| 2005/0232289 A1 | 10/2005 | Walko et al. |
| 2005/0265050 A1 | 12/2005 | Miller |
| 2006/0002110 A1 | 1/2006 | Dowling et al. |
| 2006/0044152 A1 | 3/2006 | Wang |
| 2006/0044789 A1 | 3/2006 | Curtis |
| 2006/0065750 A1 | 3/2006 | Fairless |
| 2006/0085301 A1 | 4/2006 | Leahy |
| 2006/0125426 A1 | 6/2006 | Veskovic et al. |
| 2006/0253885 A1 | 11/2006 | Murphy et al. |
| 2007/0027645 A1 | 2/2007 | Guenther et al. |
| 2007/0043478 A1 | 2/2007 | Ehlers et al. |
| 2007/0085701 A1 | 4/2007 | Walters et al. |
| 2007/0097993 A1 | 5/2007 | Bojahra et al. |
| 2007/0100571 A1 | 5/2007 | Miki |
| 2007/0145915 A1 | 6/2007 | Roberge et al. |
| 2007/0222581 A1 | 9/2007 | Hawkins et al. |
| 2007/0247859 A1 | 10/2007 | Haddad et al. |
| 2007/0252528 A1 | 11/2007 | Vermuelen et al. |
| 2008/0143273 A1 | 6/2008 | Davidson et al. |
| 2008/0147465 A1 | 6/2008 | Raines et al. |
| 2008/0183337 A1 | 7/2008 | Szabados |
| 2008/0218317 A1 | 9/2008 | Choi |
| 2008/0266664 A1 | 10/2008 | Winston et al. |
| 2008/0275802 A1 | 11/2008 | Verfuerth et al. |
| 2008/0291054 A1 | 11/2008 | Groft |
| 2008/0315772 A1 | 12/2008 | Knibbe |
| 2008/0316743 A1 | 12/2008 | Shaneour |
| 2009/0000217 A1 | 1/2009 | Verfuerth et al. |
| 2009/0059603 A1 | 3/2009 | Recker et al. |
| 2009/0090895 A1 | 4/2009 | Hogan, Jr. |
| 2009/0147507 A1 | 6/2009 | Verfuerth et al. |
| 2009/0150004 A1 | 6/2009 | Wang et al. |
| 2009/0222142 A1 | 9/2009 | Kao et al. |
| 2009/0243517 A1 | 10/2009 | Verfuerth et al. |
| 2009/0248217 A1 | 10/2009 | Verfuerth et al. |
| 2009/0251066 A1 | 10/2009 | Baaijens et al. |
| 2009/0299811 A1 | 12/2009 | Verfuerth et al. |
| 2009/0315485 A1 | 12/2009 | Verfuerth et al. |
| 2010/0061088 A1 | 3/2010 | Bartol et al. |
| 2010/0246168 A1 | 9/2010 | Verfuerth et al. |
| 2011/0060701 A1 | 3/2011 | Verfuerth et al. |
| 2011/0146669 A1 | 6/2011 | Bartol et al. |
| 2011/0235317 A1 | 9/2011 | Verfuerth et al. |
| 2011/0279063 A1 | 11/2011 | Wang et al. |
| 2012/0037725 A1 | 2/2012 | Verfuerth |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0044350 A1 | 2/2012 | Verfuerth |
| 2012/0081906 A1 | 4/2012 | Verfuerth et al. |
| 2012/0167957 A1 | 7/2012 | Verfuerth et al. |
| 2012/0274222 A1 | 11/2012 | Verfuerth et al. |
| 2013/0006437 A1 | 1/2013 | Verfuerth et al. |
| 2013/0033183 A1 | 2/2013 | Verfuerth et al. |
| 2013/0094230 A1 | 4/2013 | Verfuerth et al. |

FOREIGN PATENT DOCUMENTS

| | | |
|---|---|---|
| JP | 05-336868 | 12/1993 |
| JP | 2010-046091 | 3/2010 |
| WO | WO-2004/023849 A1 | 3/2004 |

OTHER PUBLICATIONS

Deru et al.; BigHorn Home Improvement Center Energy Performance; ASHRAE Transactions, Atlanta: 2006 vol. 112, 26 pages.

Galasiu et al. "Energy saving lighting control systems for open-plan offices: a filed study"; Jul. 2007, National Research Council Canada; vol. 4; No. 1, pp. 1-28, 56 pages.

Halliday, D., et al., Physics Part I and II; John Wiley & Sons, Inc. 1967 (9 pgs.).

Harris, L. R., et al., "Pacific Northwest Laboratory's Lighting Technology Screening Matrix," PNL-SA-23871, Apr. 1994, U.S. Department of Energy, Pacific Northwest Laboratory, Richland, Washington 99352, pp. 1-14.

Notice of Acceptance (NOA) from Miami-Dade County, Building Code Compliance Office, Product Control Division, Approval Date Dec. 13, 2007, 2 pages.

Sun-Dome /Tubular Skylight, Daylighting Technologies, Riviera Beach, FL, revision Oct. 22, 2007, 1 page.

* cited by examiner

Account Number: 10-ABCCO01
Statement Due: 2/28/2007

Customer and Mailing Address
ABC Company
123 Main Street
Anytown, USA 11111

Your Current Energy Usage

| Jace Number | From | To | Usage |
|---|---|---|---|
| #4567 | 2/1/2007 | 2/28/2007 | 1,043,332 kWh |

Detail of Current Charges

Energy Charge Calculation

| | | |
|---|---:|---|
| Original Monthly Base Line kWh | 2,125,386 | kWh |
| Current kWh | 1,043,332 | kWh |
| kWh Reduced | 1,082,054 | kWh |
| Virtual Power Plant Rate | $ 0.02 | kWh |
| Total Energy Charge | $ | 21,641.08 |

| | | |
|---|---|---:|
| Total Current Charges | $ | 21,641.08 |

FIG. 1C

LIGHTING SYSTEMS AND METHODS FOR DISPLACING ENERGY CONSUMPTION USING NATURAL LIGHTING FIXTURES

CROSS-REFERENCE TO RELATED PATENT APPLICATIONS

The present application is a Continuation of U.S. patent application Ser. No. 13/371,249, filed Feb. 10, 2012, which is a Continuation-in-Part of U.S. patent application Ser. No. 12/559,240 (now U.S. Pat. No. 8,376,600) filed Sep. 14, 2009, which is a Continuation-In-Part of U.S. patent application Ser. No. 11/771,317 (now U.S. Pat. No. 7,638,743), filed Jun. 29, 2007. U.S. application Ser. No. 13/371,249 is also a Continuation-in-Part of U.S. patent application Ser. No. 11/744,083 (now U.S. Pat. No. 8,626,643), filed May 3, 2007. U.S. application Ser. No. 13/371,249 is also a Continuation-in-Part of (a) U.S. patent application Ser. No. 11/771,317, filed Jun. 29, 2007 (now U.S. Pat. No. 7,638,743) and (b) U.S. patent application Ser. No. 12/550,270 (now U.S. Pat. No. 8,450,670), filed Aug. 28, 2009, which is a Continuation-In-Part of U.S. application Ser. No. 12/240,805 (now U.S. Pat. No. 8,344,665), filed Sep. 29, 2008, which is a Continuation-In-Part of U.S. application Ser. No. 12/057,217, filed Mar. 27, 2008 (now U.S. Pat. No. 8,406,937). The entireties of U.S. patent application Ser. Nos. 13,371,249, 12/559,240, 11/744,083, 12/550,270, 12/240,805, 12/057,217, and 11/771,317 are hereby incorporated by reference.

BACKGROUND

The present disclosure relates to lighting systems and methods for displacing energy consumption. The present disclosure also relates to natural lighting fixtures and utility management systems.

SUMMARY

According to an exemplary embodiment, a kit for displacing energy during peak daylight periods includes a plurality of light pipes and at least one sensor configured to measure the light provided to a building environment by at least one of the plurality of light pipes. The kit further includes a control system configured to receive the measurement information from the at least one light sensor and to cause electric lighting fixtures in the building environment to turn off or dim when the light provided to the building environment by the light pipes meets a minimum threshold; wherein the control system is further configured to calculate a payment to be received in exchange for turning off or dimming the electric lighting fixtures in the building environment.

Some embodiments of the present disclosure relate to systems and methods for financing the cost of energy efficient equipment (e.g., such as energy efficient lighting systems). The energy efficient equipment provides energy savings relative to older or less efficient equipment. This energy savings results in lower bills from the utility company. The energy saved (e.g., in terms of kilowatt-hours) may be referred to as negawatt hours (i.e., units of energy saved). Some exemplary systems and methods described herein can calculate the negawatt hours of energy saved over time by use of the energy efficient equipment rather than the older or less efficient equipment. The systems and methods can issue an invoice calculated by multiplying the negawatts hours (i.e., units of energy saved) for a period of time by a utility rate. Using such systems and methods, the new energy efficient equipment can be paid for using such invoiced amounts. Therefore, the cost for the energy efficient equipment can be paid for entirely using savings obtained by use of the energy efficient equipment. Such a model can create a situation where the decision to buy the energy efficient equipment is cost-free relative to using old or less efficient equipment.

For clarity, in many of the embodiments described herein, the energy efficient equipment is financed via negawatt hours multiplied by utility rate. It is important to note that the negawatt hours are not actual energy expended by the equipment, but represent energy saved by the equipment. The utility rate may be calculated by apportioning the cost of the equipment over a period of time. A series of invoiced amounts (e.g., calculated by [negawatt hours*new utility rate]) results in full payment of the energy efficient equipment. Further, it is important to note that, in some embodiments, the new utility rate is not the actual or current cost of energy, but rather is calculated by apportioning the return needed for repayment of the energy efficient equipment as a function of the energy savings provided by the energy efficient equipment.

Another embodiment of the invention relates to a system for displacing energy. The system includes energy efficient lighting technology for replacing old lighting technology in a building. The system further includes a computer system for estimating a power base load capacity relief resulting from replacing the old lighting technology with the energy efficient lighting technology. The computer system is configured to receive technology cost information including fixed and variable costs to install and maintain the energy efficient lighting technology. The computer system is configured to calculate a return needed for repayment of the technology cost and is configured to determine a new utility rate by apportioning the return needed for repayment of the technology cost as a function of the estimated power base load capacity relief. The computer system is configured to generate a utility invoice for sending to a utility consumer associated with the building, the utility invoice comprising a payment amount for a power reduction over time at the new utility rate. The power reduction over time is provided by use of the energy efficient lighting technology. The new utility rate is not applied to actual energy use over time and the utility invoice does not request payment for energy use over time.

The computer system may be configured to transmit the generated utility invoice to a utility consumer that owns or leases the building where the energy efficient lighting technology has been installed. The payment amount billed to the utility consumer via the utility invoice may be less than a cost savings attained by the utility consumer via the replacement of the old lighting technology with the energy efficient lighting technology. The computer system may be further configured to communicate pollution credit information to a trading exchange for trading pollution credits. The system may further include a metering device configured to meter energy usage associated with the old lighting technology and the energy efficient lighting technology. The computer may use metering information received from the metering device to estimate the power base load capacity relief. The payments made by the utility consumer for the power reduction over time at the new utility rate may be the only payment sources for the installation of the energy efficient lighting technology.

In an exemplary embodiment, the computer system's apportioning of the return needed for repayment of the technology cost as a function of the estimated power base load capacity relief is completed by: (a) dividing the return needed for repayment of the technology cost by a unit of time to obtain a first value; (b) determining the power base load capacity relief associated with the unit of time to obtain a second value; and (c) dividing the first value by the second value to obtain the new utility rate.

Another aspect of the invention relates to a system for completing a financial transaction with a second party. The system includes a light sensor mounted near a natural lighting fixture and configured to measure an amount of light provided from the natural lighting fixture to a building environment. The system further includes processing electronics configured to receive information from the light sensor and to use the received information to determine when the amount of light provided from the natural lighting feature is sufficient to allow one or more electric lighting fixtures to be turned off. The processing electronics are further configured to cause the one or more electric lighting fixtures to turn off in response to the determination. The processing electronics are further configured to calculate the energy saved from turning the one or more lighting fixtures off. The system further includes a communications interface configured to transmit the results of the calculation of energy saved from the processing electronics to the second party for completing a sales transaction.

Another aspect of the invention relates to a computerized method for displacing energy to a second party. The method includes receiving information from a light sensor configured to measure an amount of light provided from the natural lighting feature to a building environment. The method further includes providing the received information to processing electronics configured to use the received information to determine when the amount of light provided from the natural lighting feature is sufficient to allow one or more electric lighting fixtures to be at least partially turned off or dimmed. The method yet further includes using the processing electronics to cause the one or more electric lighting fixtures to turn off in response to a determination that the amount of light provided from the natural lighting feature is sufficient to allow one or more electric lighting fixtures to be at least partially turned off or dimmed. The method also includes using the processing electronics to calculate the energy saved from turning off or dimming the one or more electric lighting fixtures. The method also includes communicating results of the calculation of energy saved from the processing electronics to the second party for completing a financial transaction. The natural lighting feature may be a light pipe for mounting to the building environment and configured to provide light to the interior space.

Yet another aspect of the invention relates to computer-readable media with computer-executable instructions embodied thereon that when executed by a computing system perform a method for reducing energy usage. The media includes instructions for receiving information from a light sensor mounted near a natural lighting feature and configured to measure an amount of light provided from the natural lighting feature to a building environment. The media further includes instructions for using the received information to determine when the amount of light provided from the natural lighting feature is sufficient to allow one or more electric lighting fixtures to be turned off or dimmed. The media yet further includes instructions for causing the one or more electric lighting fixtures to turn off or dim in response to a determination that the amount of light provided from the natural lighting feature is sufficient to allow one or more electric lighting fixtures to be turned off or dimmed. The media also includes instructions for calculating the energy saved from turning off or dimming the one or more electric lighting fixtures. The media yet further includes instructions for communicating results of the calculation of energy saved from the processing electronics to a second party for completing a transaction.

Another aspect of the invention relates to a utility financial model which includes setting a new utility rate after the introduction of a new utility technology that provides immediate capacity relief and reduces the base load capacity and the peak load capacity to electric power providers. The new utility rate is not based solely on performance of the new utility technology but rather based on fixed and variable costs to introduce the new utility technology.

Another aspect relates to a method for financing installation of a new utility technology after installation of the new utility technology. The method includes obtaining power reduction information resulting from change from a first technology to a second technology, receiving technology cost information including fixed and variable costs to install and maintain the second technology, and calculating a new utility rate for use of the second technology and to repay technology costs associated with the second technology, the new utility rate comprising an accounting for received technology cost information of the second technology and power reduction information.

Yet another aspect relates to a system for financing installation of a new utility technology where up front payments are avoided or reduced. The system includes a metering device measuring capacity relief resulting from change from a first technology to a second technology and a processor with programmed instructions for determining aggregate displaced capacity from use of the second technology and a new utility rate based on costs associated with the change to the second technology and power reduction.

Yet still another aspect relates to a system for providing power at a reduced cost. The system includes a utility meter coupled to new technology which measures utility usage on an absolute and real-time basis, a processor coupled to the utility meter which receives measurements of utility usage from the utility meter and calculates a new utility rate based on utility usage and technology costs, and a communications interface which communicates information needed to provide a utility invoice based on the new utility rate.

Another embodiment of the invention relates to a method for financing installation of a new utility technology by a utility consumer after installation of the new utility technology at a facility associated with the utility consumer. The method includes obtaining, at a metering device, power usage information associated with operation of a second technology. The method also includes calculating, at a processor and based on the power usage information obtained from the metering device, a power base load capacity relief of an electrical system to a utility provider resulting from a change from a first technology to the second technology. The method also includes receiving, at the processor, a technology cost including fixed and variable costs to install and maintain the second technology. The method yet further includes determining, at the processor, a new utility rate by apportioning the return needed for repayment of the technology cost as a function of the power base load capacity relief. The method also includes calculating and providing a utility invoice to the utility consumer for a power reduction over time at the new utility rate, the power reduction over time provided by use of the second technology. The amount billed to the utility consumer via the utility invoice may be less than a cost savings attained by the utility consumer via the power base load capacity relief such that the amount billed to the utility consumer is financed via a portion of the cost savings.

These and other features, aspects and advantages of the present invention will become apparent from the following description, appended claims, and the accompanying exemplary embodiments shown in the drawings, which are briefly described below.

BRIEF DESCRIPTION OF THE FIGURES

The disclosure will become more fully understood from the following detailed description, taken in conjunction with the accompanying figures, wherein like reference numerals refer to like elements, in which:

FIG. 1C is an illustration of a simplified invoice calculated and provided from a technology provider to a utility consumer, according to an exemplary embodiment;

DETAILED DESCRIPTION

Exemplary embodiments will be described below with reference to the accompanying drawings. It should be understood that the following description is intended to describe exemplary embodiments of the disclosure, and not to limit the disclosure.

Figure 1A:
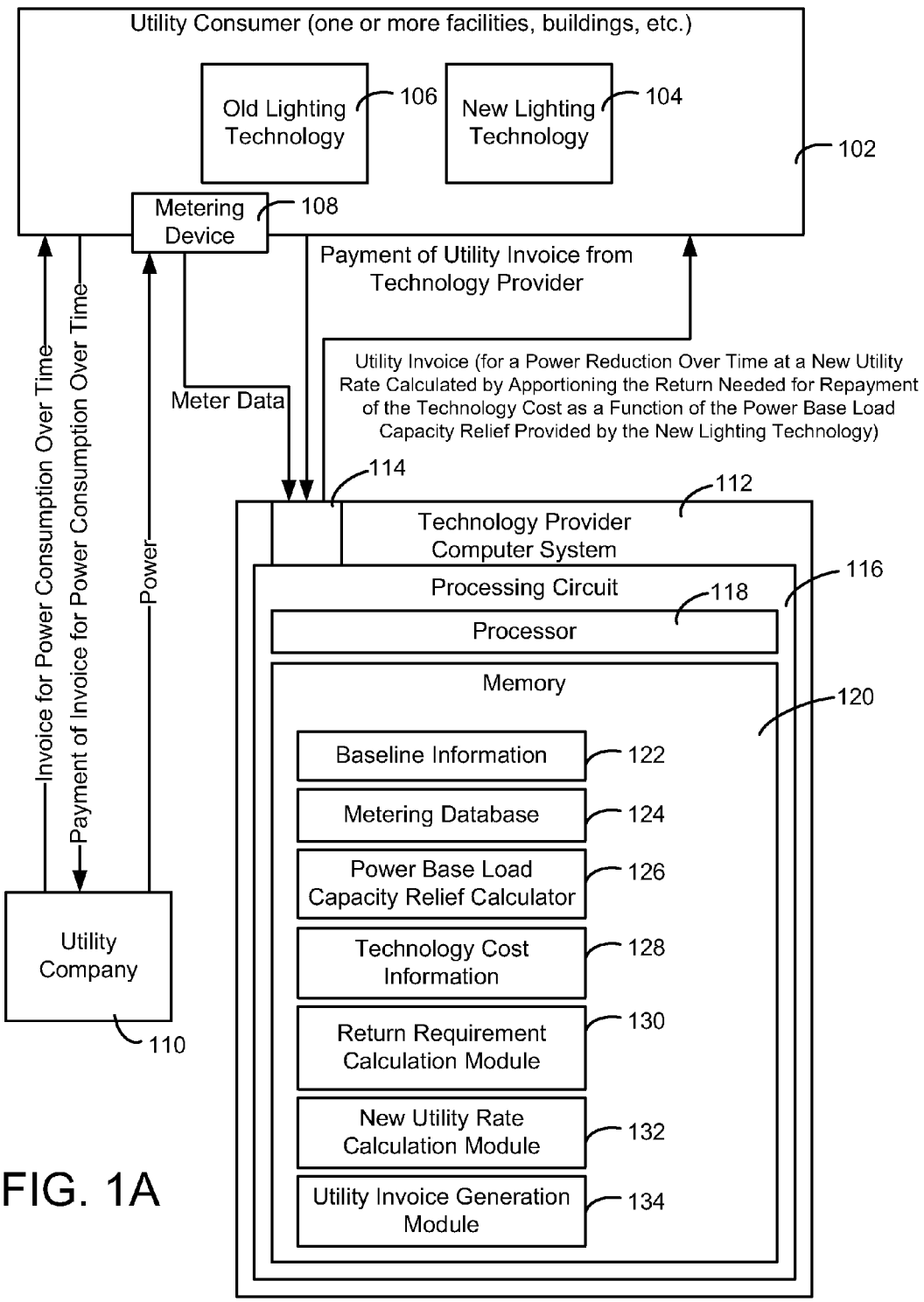
FIG. 1A is a diagram illustrating a system for financing installation of a new utility technology, according to an exemplary embodiment.

FIG. 1A illustrates an exemplary system for facilitating (e.g., financing) installation of a new technology (e.g., lighting technology) by a utility consumer. The system is shown to include a utility consumer 102. The utility consumer 102 can be a manufacturing facility, a commercial facility, an educational facility, a group of buildings, a single building, a single tenant location within a larger facility or building, or any other type of utility consumer that utilizes energy-consuming lighting technology.

New lighting technology 104 is installed at a facility owned by utility consumer 102. The new lighting technology 104 replaces old lighting technology 106 (e.g., traditional industrial/commercial light fixtures) within the facility of utility consumer 102. New lighting technology 104 can be new, more efficient lighting fixtures; new non-utility light providers (e.g., sunlight); or a combination of utility-based and non-utility based lighting. An exemplary impact might be a 50% reduction in base load energy use and a greater quantity of higher quality light. Moreover, with additional controls, the technology may provide an additional 25-50% in instantaneous peak load capacity relief.

In addition to the installation of new lighting technology 104, a metering device 108 is installed at the utility consumer's facility. Metering device 108 can aggregate energy consumed by a utility consumer by metering power received from the utility company 110. Metering device 108 can provide meter data to a technology provider 112. The meter data may be transferred from the metering device 108 to the technology provider 112 via one or more networks, communications interfaces, computer systems, wireless links, or wired links.

In the embodiment illustrated in FIG. 1A, the utility consumer 102 continues to be invoiced by the utility company 110 for actual power consumption over time. Utility consumer 102 pays the invoices. In an exemplary embodiment, therefore, the relationship between the utility consumer 102 and the utility company 110 does not change (other than utility consumer 102's bills being smaller due to the move from old lighting technology 106 to new lighting technology 104).

Installation of new lighting technology 104 can be paid for utilizing a payment system where one or more payments made by the consumer 102 to the technology provider 112 are tied to units of energy reduction achieved by the utility consumer 102's switch from the old lighting technology 106 to the new lighting technology 104. To achieve this arrangement, the technology provider 112 has a computer system including a communications interface 114 that receives the meter data transmitted from the metering device 108. A processing circuit 116 of the technology provider 112's computer system processes the meter data to calculate a utility invoice that is provided to the utility consumer 102. The utility invoice includes an invoiced dollar amount tied to a power reduction over time achieved by the switch from the old lighting technology 106 to the new lighting technology 104. The power reduction over time is multiplied by a new utility rate calculated by processing circuit 116. The new utility rate is obtained by apportioning the return needed for repayment of the technology cost as a function of the power base load capacity relief provided by the new lighting technology. The utility consumer 102 pays the utility invoice received from the technology provider 112 as well as the regular invoice received from the utility company 110. In an exemplary embodiment, the amount billed to the utility consumer 102 via the utility invoice from the technology provider 112 is less than a cost savings attained by the utility consumer 102 via the power base load capacity relief provided by the switch from the old lighting technology 106 to the new lighting technology 104. The utility consumer 102 can then view the amount paid to the technology provider 112 as being financed by at least a portion of the cost savings attained by switching from the old lighting technology 106 to the new lighting technology 104.

Processing circuit 116 is shown to include processor 118 and memory 120. Processor 118 can be implemented as a general purpose processor, an application specific integrated circuit (ASIC), one or more field programmable gate arrays (FPGAs), a group of processing components, or other suitable electronic processing components. Memory 120 is one or more devices (e.g., RAM, ROM, flash memory, hard disk storage, etc.) for storing data and/or computer code for completing and/or facilitating the various processes or steps described in the present disclosure. Memory 120 may be or include volatile memory or non-volatile memory. Memory 120 may include database components, object code components, script components, or any other type of information structure for supporting the various activities and information structures described in the present disclosure. According to an exemplary embodiment, memory 120 is communicably connected to processor 118 via processing circuit 116 and includes computer code for executing (e.g., by processing circuit 116 and/or processor 118) one or more processes described herein.

Memory 120 is shown to include baseline information 122. Baseline information 122 can be a computer equation or multiplier for describing the energy utilization of old lighting technology 106. For example, baseline information 122 may be a statement such as: old lighting system 106 operates at about 100 kWh per hour of use. Depending on the particular utility consumer (e.g., how many different lighting zones the consumer has in operation), baseline information 122 can be more granular (e.g., take into account many more variables beyond raw hours of use).

Metering database 124 stores meter data received from metering device 108. In other words, metering database 124 stores power usage information associated with operation of new lighting technology 104.

Memory 120 further includes a power base load capacity relief calculator 126. Power base load capacity relief calculator 126 is configured to use the baseline information 122 and the metering database 124 to calculate a power base load capacity relief of an electrical system to a utility provider 110 resulting from a change from the old lighting technology 106 to the new lighting technology 104.

Memory 120 is further shown to include technology cost information 128. Technology cost information 128 can include fixed and variable costs for installing and maintaining the new lighting technology 104. Fixed costs can include equipment costs and installation fees. Variable costs can include maintenance fees.

Memory 120 also includes return requirement calculation module 130. Return requirement calculation module 130 is configured to calculate a return needed for repayment of the technology cost associated with the new lighting technology 104.

Memory 120 also includes new utility rate calculation module 132. New utility rate calculation module 132 calculates a new utility rate that apportions the return needed for repayment of the technology cost as a function of the power base load capacity relief.

Memory 120 further includes a utility invoice generation module 134. Utility invoice generation module 134 calculates a utility invoice for providing to utility consumer 102. The utility invoice is for a power reduction over time attained by use of the new lighting technology 104 rather than the old lighting technology 106. The amount on the utility invoice is equal to the power reduction over time at the new utility rate calculated by new utility rate calculation module 132. In an exemplary embodiment, the amount billed to the utility consumer 102 via the utility invoice from the technology provider 116 is less than a cost savings attained by the utility consumer 102 via the power base load capacity relief such that the amount billed to the utility consumer is financed via a portion of the cost savings (e.g., provided by lower utility bills from utility company 110).

Installation of new lighting technology 102 can be paid for utilizing a reduced unit-based payment scheme where one or more payments are made by the utility consumer 102. Payments are tied to units of utility reduction rather than time. As such, in some embodiments, the financial model provided by technology provider 116 is not a lease of equipment. In such embodiments, the payments (calculated using the new utility rate) from the utility consumer to the technology provider 116 can be viewed as purchase of use or throughput provided by increased efficiencies from new lighting technology 102. The payments can be over time or in one lump sum.

Figure 1B:
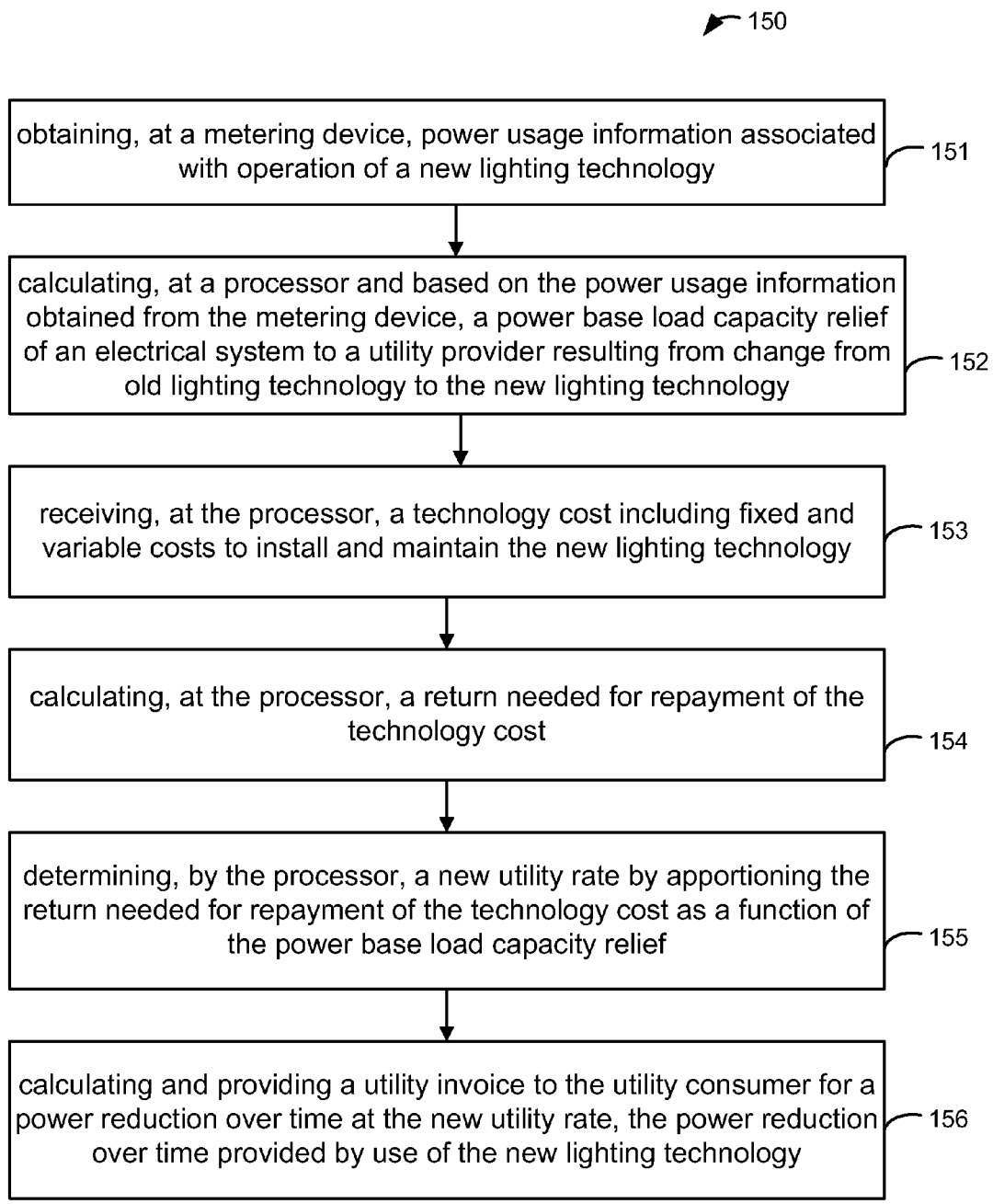
FIG. 1B is a flow chart illustrating a method for financing installation of a new utility technology (e.g., using the system of FIG. 1A), according with an exemplary embodiment.

FIG. 1B illustrates a process 150 for financing installation of a new utility technology (e.g., using the system of FIG. 1A), accordance with an exemplary embodiment. Process 150 is shown to include, at step 151, obtaining, at a metering device (e.g., metering device 108 shown in FIG. 1A), power usage information associated with operation of a new lighting technology (e.g., new lighting technology 104). Process 150 further includes calculating, at a processor (e.g., processing circuit 119 and/or processor 118) and based on the power usage information obtained from the metering device, a power base load capacity relief of an electrical system to a utility provider resulting from change from the old lighting technology to the new lighting technology (step 152). Process 150 also includes receiving, at the processor, a technology cost including fixed and variable costs to install and maintain the new lighting technology (step 153).

Referring still to FIGS. 1A and 1B, process 150 yet further includes calculating, at the processor, a return needed for repayment of the technology cost (step 154). Process 150 also includes determining, by the processor, a new utility rate by apportioning the return needed for repayment of the technology cost as a function of the power base load capacity relief (step 155). Process 150 further includes calculating and providing a utility invoice to the utility consumer (e.g., to utility consumer 102 from technology provider 116) for a power reduction over time at the new utility rate, the power reduction over time provided by use of the new lighting technology (step 156).

FIG. 1C illustrates an exemplary utility invoice calculated and provided in step 156. That is, FIG. 1C illustrates one example of a utility invoice calculated and provided from technology provider 116 to utility consumer 102. The invoiced payment amount in the example is $21,641.08. Significantly, this payment amount is not a multiplication of an energy rate by energy usage. In other words, although usage was 1,043,332 kWh, this amount is billed by the utility company 110 at the utility's rate(s) for usage. The invoice shown in FIG. 1C, on the other hand, includes a payment amount that results from the multiplication of the kWh reduced by the "Virtual Power Plant Rate" (which corresponds to the new utility rate discussed with reference to FIGS. 1A and 1B). In other words, the Virtual Power Plant Rate is calculated by apportioning the return needed for repayment of the technology cost as a function of the base load capacity relief provided by the new lighting technology. Therefore, in the example of FIG. 1C, the Virtual Power Plant Rate of $0.02 per kWh is multiplied by the kWh reduced of 1,082,054 kWh to obtain the invoiced payment of $21,641.08. As shown, the kWh Reduced is obtained by subtracting the actual kWh of 1,043,332 kWh (metered energy use associated with the new lighting technology) from 2,125,386 kWh (an original monthly baseline usage associated with the old lighting technology).

As described above, the new utility rate (i.e., the Virtual Power Plant Rate) is calculated by apportioning the return needed for repayment of the technology cost as a function of the base load capacity relief. With reference to FIG. 1C, an example of such a calculation could be as follows: If the technology cost (fixed plus variable) for new lighting equipment is $1,000,000 and the return needed for repayment of the technology cost over a five year period is $1,200,000, then this $1.2 million, or $240,000 per year, will be apportioned by the power base load capacity relief. If 12,000,000 kWh in power base load capacity relief is expected over the course of a year, the new utility rate can be calculated as $240,000 (for the year) over 12,000,000 kWh, resulting in $0.02 per kWh reduction. When actual monthly reductions are calculated (e.g., the 1,082,054 kWh reduction of FIG. 1C), it is multiplied by the new utility rate (e.g., the $0.02 per kWh shown in FIG. 1C) to result in the monthly total energy charge (e.g., $21,641.08 as shown in FIG. 1C). Accordingly, the new utility rate can be calculated using the following formula:

New Utility Rate=[(Return Needed for Repayment of Technology Cost)/(Number of Years for Repayment)]/(Expected Power Base Load Capacity Relief for a Year)

The invoice payment is then calculated:

Energy Charge=Actual kWh Reduced for a Period of Time*New Utility Rate

It should be noted that return needed for repayment of the technology cost may include a financing charge, profit margin, or other payment to account for the financing of the technology cost by the technology provider. It should also be noted that the new utility rate and/or invoice periods may be longer or shorter than years and months.

Figure 2:
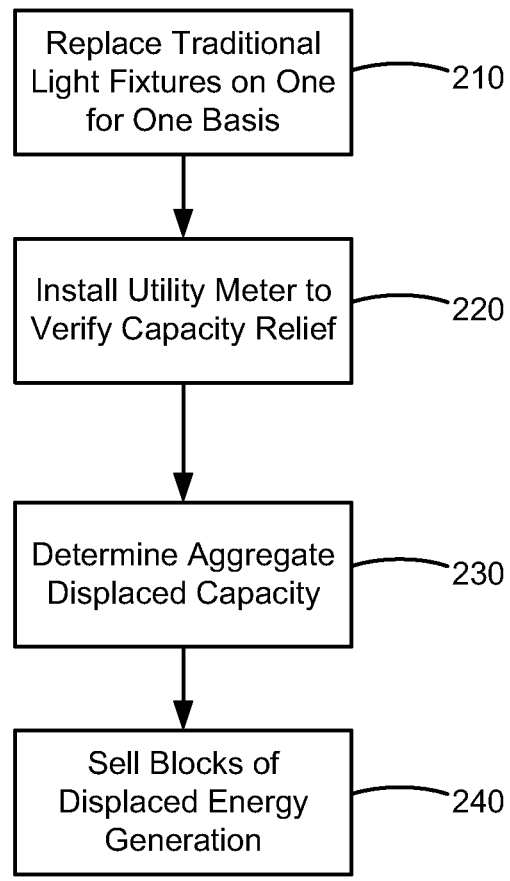
FIG. 2 is a flow chart of a process for use with the systems described herein, according to an exemplary embodiment.

FIG. 2 illustrates a flow chart of a process 200 for use with the systems described herein. Additional, fewer, or different operations may be performed depending on the particular implementation. In step 210, traditional light fixtures in a facility are replaced on a one for one basis with new more efficient fixtures. As such, each lighting fixture is replaced by another light fixture, rather than two light fixtures being replaced by one light fixture. In alternative embodiments, a certain number of existing lights are replaced by one new light fixture. In yet another embodiment, natural lighting features (e.g., sunlight) are utilized in conjunction with new utility-based features as further described herein (e.g., the system of FIG. 3A). In step 220, a utility meter is installed at the facility to verify the relief in utility capacity resulting from the installation of the new fixtures. Preferably, the metering is done using a utility-grade meter. Metering devices can also include communication components to communicate utility information to a remote location. In step 230, aggregate displaced capacity is determined based on information about the facility where new fixtures are installed and the amount of utility capacity relief. The aggregate displaced capacity can provide data necessary to determine pollution allowances or credits earned and financial savings for the facility. In step 240, blocks of displaced energy generation are sold. For example, displaced energy can be sold on a market or to the original utility company.

In an alternative embodiment, the utility consumer makes a one time cash payment based on a calculation involving the reduced kWh. Payments for the new technology installation are tied to units and not to time.

Advantageously, implementation of a new technology using the exemplary systems described herein reduces or eliminates technological and financial risk for the consumer. Further, the consumer is assured positive cash flow and is provided the measurement capabilities required for emission credits. Such emissions credits can be sold in the open market or on an exchange like the Chicago Climate Exchange, Inc. Verification steps can also be facilitated by the systems described herein. For example, a measurement and verification process can be used to verify that the new lighting technology saved the consumer energy as predicted or estimated.

Figure 3A:
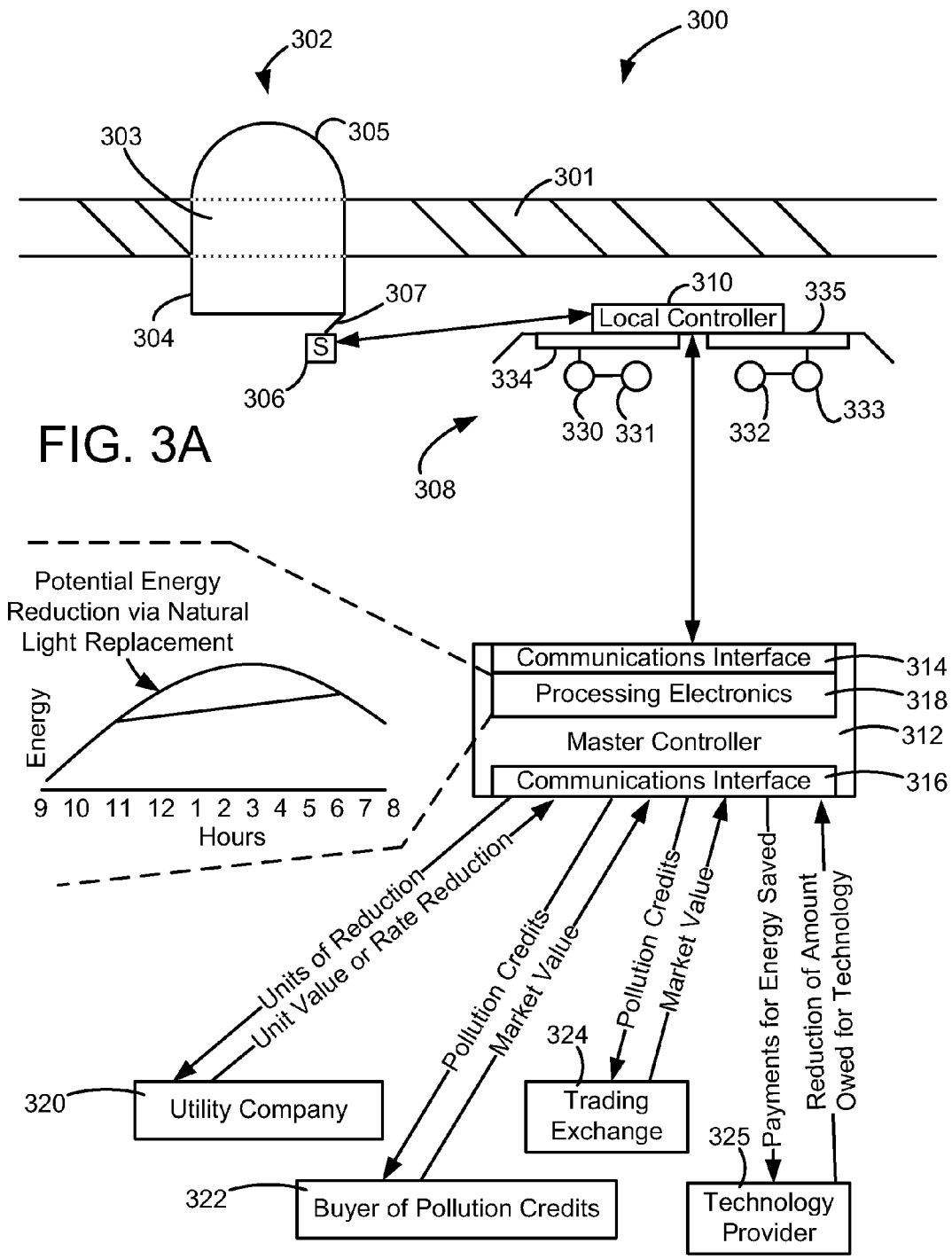
FIG. 3A is a block diagram of a system for displacing energy, according to an exemplary embodiment.

Referring now to FIG. 3A, a lighting system 300 for displacing energy during peak daylight periods is shown, according to an exemplary embodiment. Lighting system 300 is intended for installation in a building environment (e.g., office building, warehouse, manufacturing facility, gymnasium, etc.). A light pipe 302 is shown as installed on and in a building ceiling 301. Light pipe 302 is configured to provide outdoor light to the building's interior environment. Light pipe 302 (in its most basic form) is shown to include a reflective tube 303, a diffuser 304, and a light collection system 305. Light collection system 305 is configured to direct natural light into the reflective tube and toward diffuser 304 mounted opposite to light collection system 305. Diffuser 304 may include a concave surface facing the interior of the building environment. It should be noted that the building environment may include a plurality of light pipes 302. Further description of various exemplary embodiments of the light pipes may be found in U.S. application Ser. No. 12/559,240, which is incorporated by reference in its entirety.

As shown in FIG. 3A, light pipe 302 is coupled to a sensor 306. Sensor 306 is configured to measure the light provided to the building environment by light pipe 302. Sensor 306 may be an optical sensor, a photoresistor, a photoconductor, a photodiode, a phototransistor, a charge-coupled imaging device, or any other suitable device or electronics for measuring light. Sensor 306 may be coupled to a bottom edge of light pipe 302, held under light pipe 302 via a bracket or arm 307 that is not coupled to a structure of the light pipe, or otherwise held in place to measure the light provided by the light pipe. In an alternative embodiment sensor 306 is held inside or above the light pipe and configured to detect the amount of light available to the light pipe. In yet other embodiments sensor 306 is placed or configured to indicate a light level in a building's area of interest. A plurality of light pipes 302 may be installed within a single building environment for providing light to the building environment. Further, the light pipe and sensor pair shown in FIG. 3A may be repeated many times over within a single building environment. In other embodiments a plurality of light pipes will be provided without a sensor and the light provided by the plurality of light pipes will be estimated using another sensor or another sensor-and-light pipe pair.

Lighting system 300 is further shown to include an electric lighting fixture 308 which may be a high intensity fluorescent (HIF) lighting fixture. In the embodiment shown in FIG. 3A, lighting fixture 308 includes or is closely coupled to a local controller 310. Local controller 310 may include a wireless (e.g., RF) or wired communications interface that may be configured to receive information (e.g., representative of the amount of light provided by the light pipe) from sensor 306. Once the information from sensor 306 is received local controller 310 may be configured to process the information using local processing electronics or may forward the information to another device for processing. In FIG. 3A, local controller 310 is shown in communication with master controller 312. Master controller 312 is shown to include a first communications interface 314, a second communications interface 316, and processing electronics 318. First communications interface 314 is configured to receive information from local controller 310 including, for example, a representation of light levels detected by sensor 306. In an exemplary embodiment processing electronics 318 are configured to use the received information to determine when the amount of light provided from the natural lighting feature (e.g., light pipe 302) is sufficient to allow one or more electric lighting fixtures (e.g., lighting fixture 308) to be turned off. In response to a determination that the amount of light provided by light pipe 302 is sufficient, processing electronics 318 may be configured to cause lighting fixture 308 to turn off. Processing electronics 318 may further be configured to calculate the energy saved by turning the one or more electric lighting fixtures off (or otherwise reducing light and energy output of the electric lighting fixture). Second communications interface 316 is configured to communicate with other parties such as (but not limited to) a utility company 320, a buyer of pollution credits 322, and a trading exchange 324. Processing electronics 318 may be configured to cause communications interface 316 to communicate the results of the calculation of energy saved to a second party (e.g., utility company 320, buyer 322, trading exchange 324, etc.) for, e.g., completing a transaction.

In an embodiment where local controller 310 is configured to locally process the received information, processing electronics of local controller 310 may complete the same determinations, control activities, calculations, and communications as described with reference to processing electronics 318. In various exemplary embodiments, either processing electronics 318 or local controller 310 may be configured to turn off less than an entire lighting fixture in response to a determination that the light provided by the light pipe is sufficient. For example, local controller 310 may be configured to turn off half or one fourth of the fluorescent bulbs or lamps 330, 331, 332, 333 of fixture 308 by providing appropriate power switching and/or control signals to ballasts 334, 335. In other embodiments local controller 310, ballasts 334, 335, or another device associated with lighting fixture 308 may be configured to controllably and incrementally dim (e.g., by step-dimming ballasts, etc.) one or more of bulbs 330, 331, 332, 333 to achieve energy savings in response to a determination that lighting levels (e.g., provided by one or more light pipes) are sufficient. In other exemplary embodiments a plurality of lighting fixtures 308 may be distributed into multiple zones and a reduction of energy may be achieved by controllably turning off or dimming some of the lighting fixtures within a zone—but not others. In yet other exemplary embodiments a first zone or other grouping of lighting fixtures may be turned off or reduced in response to a first brightness threshold. As the light provided by one or more light pipes increases, another zone or grouping of lighting fixtures may be turned off or otherwise reduced. Zone-based control is described in U.S. application Ser. No. 12/550,270, the entirety of which is incorporated by reference.

Referring still to FIG. 3A, processing electronics 318 may include one or more processing circuits, processors, and memory. The processor may be a general purpose processor or a specific purpose processor. The memory may be or include non-volatile memory or volatile memory. The memory may be configured to store computer code (e.g., executable code, object code, script code, source code, etc.) for execution by the processor. The computer code stored in the memory may cause a control system (e.g., including master controller 312 generally and processing electronics 318 more particularly) to complete the activities described herein. For example, the memory may store computer code for completing the determining or communication triggering steps described below with respect to FIG. 3B when the computer code is executed by a processor of processing electronics 318. Processing electronics 318 may be considered configured for the activities described herein when memory of the processing electronics includes computer code for causing the completion of said activities.

Figure 3B:
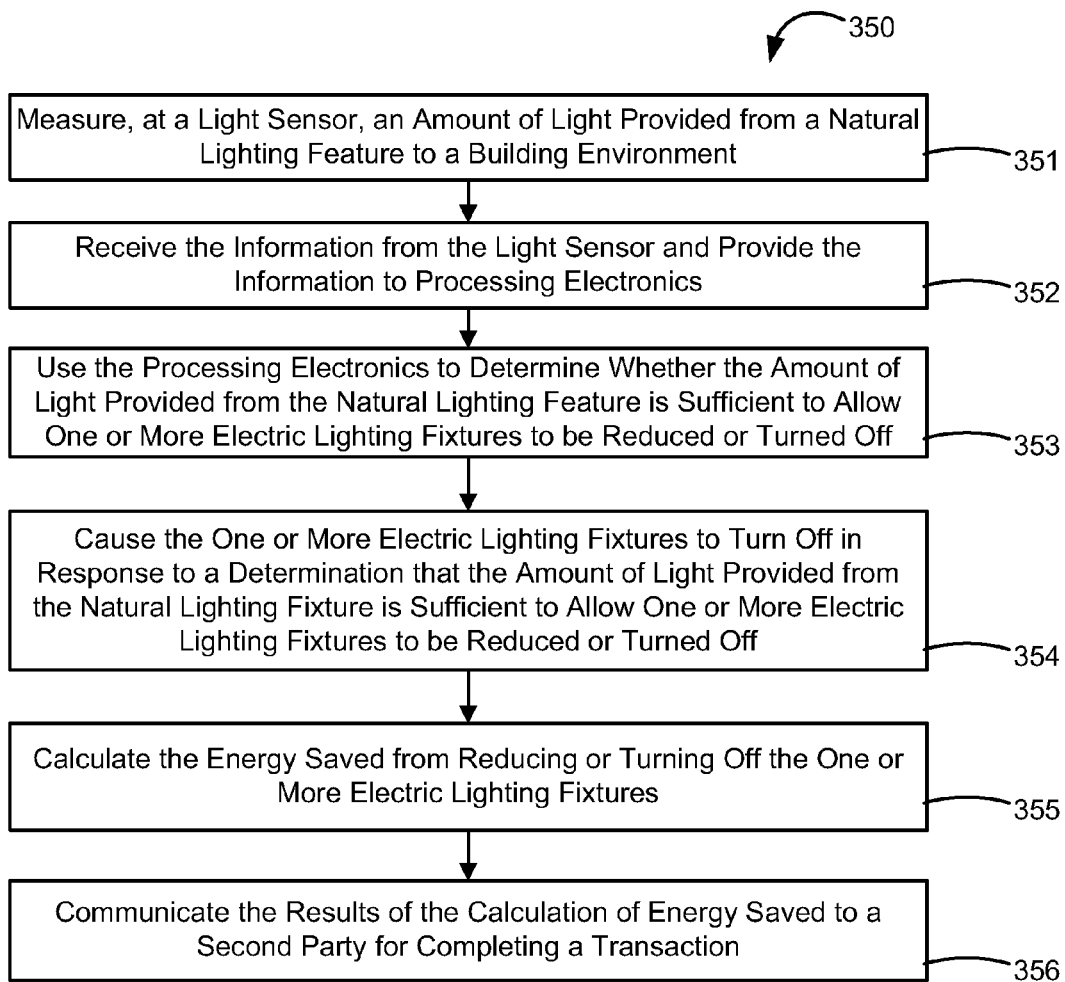
FIG. 3B is a flow chart of a process for selling displaced energy, according to an exemplary embodiment.

Referring now to FIG. 3B, a process 350 for selling displaced energy is shown, according to an exemplary embodiment. Process 350 is shown to include measuring, at a light sensor, an amount of light provided from a natural lighting feature (e.g., one or more light pipes) to a building environment (step 351). The measurement may occur entirely by the light sensor (e.g., sensor 306 shown in FIG. 3A) or be completed in conjunction with other circuitry or electronics. According to varying exemplary embodiments, the measurement may include steps beyond converting a received amount of light into an electrical output signal. For example, the measurement may include any number of normalization or conversion steps to convert the signal from the sensor to, for example, a measure of luminescence, a percentage of one hundred, or otherwise. Process 350 further includes receiving information from the light sensor and providing the information to processing electronics (step 352). The information may be received from the light sensor by a wireless transceiver associated with processing electronics, by a wired interface, or by another circuit associated with the processing electronics. Process 350 yet further includes using the processing electronics to determine whether the amount of light provided from the natural lighting feature is sufficient to allow one or more electric lighting fixtures to be turned off, dimmed, or output otherwise reduced (step 353). Step 353 may include one or more thresholding, comparison, or other processing steps. In an exemplary embodiment, for example, a threshold level at which the amount of light provided from the natural lighting feature may be set by a user (e.g., via an input interface), by industry standards for the building environment, or otherwise.

Referring still to FIG. 3B, process 350 also includes causing one or more electric lighting fixtures to turn off in response to a determination that the amount of light provided from the natural lighting feature is sufficient to allow one or more electric lighting fixtures to be reduced or turned off (step 354). In various exemplary embodiments other variables or information may also be taken into account by the processing electronics to determine whether to make the "off" switch. For example, the processing electronics of the controller may be configured to estimate a potential energy reduction via the "off" switch and natural light replacement (a conceptual model is illustrated in FIG. 3A)—and may further be configured to offer the reduction to one or more parties (e.g., parties 320-324) prior to making the "off" switch. Accordingly, it should be noted that step 355 (calculating the energy saved from turning the one or more electric lighting fixtures off) may be completed prior to actually causing any lighting fixtures to turn off (step 354). Process 350 further includes communicating the results of the calculation of energy saved to a second party for completing a transaction (step 356). As illustrated in FIG. 3A, the transaction may take a variety of different forms. In one embodiment, for example, utility company 320 may be provided with units (e.g., fractions of a unit, watts, watts per hour, etc.) of energy reduction. As explained above, this energy reduction may be modeled or treated as added capacity by a utility company. Therefore, a large building environment having many lighting fixtures (e.g., fixture 308) may be able to serve as a "virtual power plant" for the utility and the owner of the building environment (or of the lighting system for the building) may be compensated according to the above-described financial models. For example, master controller 312 may be configured to communicate with a technology provider 325 regarding the energy reductions achieved via system 300. In exchange for energy reductions and the associated utility cost savings, the building operator may provide technology provider 325 with payments for energy saved in exchange for a reduction of an amount owed by the building operation to technology provider 325. In an exemplary embodiment the information communicated from controller 312 to technology provider 325 is not actual payment information but rather a notification message regarding the energy saved (for the day, for the month, etc.). In such an embodiment technology provider 325 may invoice the building owner based on the received notification messages—also informing the building owner of the amount still owed on the new technology. Referring to buyer 322, the energy reduction may be sold to a third party buyer as pollution credits (e.g., carbon credits) in exchange for the market value of those pollution credits. Similarly, pollution credits or other energy credits may be traded or exchanged via a trading system or trading exchange 324.

Utility company 320, buyer of pollution credits 322, trading exchange 324, and technology provider 325 may each include one or more computer systems configured to facilitate the data communications described herein. For example, utility company 320 may include a utility finance computer configured to calculate the new rates for a party based on an energy reduction achieved using the lighting system of FIG. 3A. These new rates may be communicated to the system of FIG. 3A via data messages, via an electronic invoice, via a paper invoice, or otherwise. In other exemplary embodiments the utility finance computer provides the system of FIG. 3A with a total aggregate savings value (e.g., total dollars saved for a day, total dollars saved for a month, etc.) rather than new rate information.

The power base load capacity relief (i.e., electrical relief) provided by energy saving retrofitting has advantages for utility companies (e.g., power companies) as well as consumers of energy. A component of the current energy policy debate has focused on developing enough system capacity to efficiently, safely, and reliably meet a nation's escalating demand for electricity. The concept of providing a virtual power plant via energy saving installations and retrofitting can develop capacity for meeting such demands.

One method for financing the installations and retrofitting can include the utility (e.g., power company) investing in customer-side (e.g., end-user facility) investments. The utility would then be allowed to bill the consumer for a power reduction over time at a new utility rate (calculated by apportioning the return needed for repayment of the technology cost as a function of the estimated power base load capacity relief), where the power reduction over time is provided by the consumer's use of the energy efficient technology.

When multiple energy saving and direct-use renewable technologies are aggregated at an end-user's site (e.g., the point of use), the resulting ongoing energy reduction may be described as a Permanent Distributed Load Reduction (PDLR). Additionally, such energy saving measures may provide the utility with a significant increase in instantaneous or peak load capacity.

Figure 4:
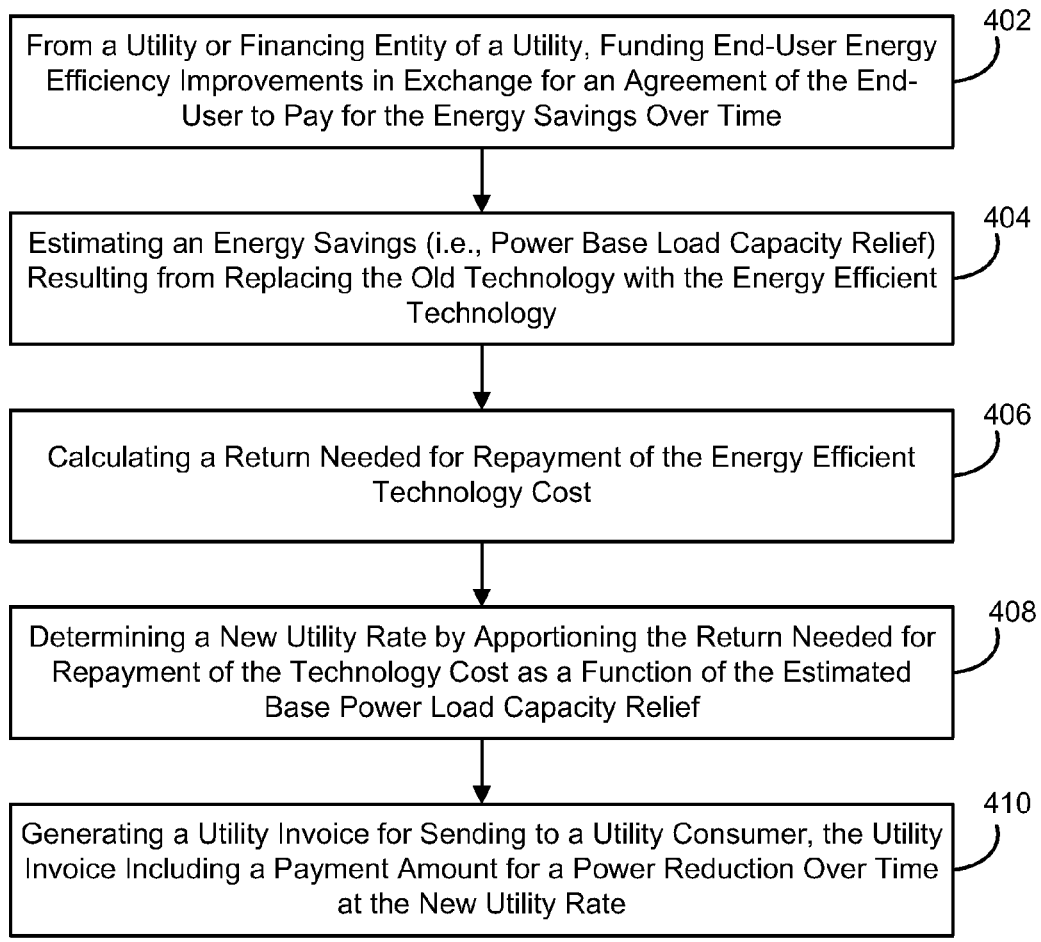
FIG. 4 is a flow chart of a process for generation of a utility invoice by a utility company, according to an exemplary embodiment.

FIG. 4 illustrates a process 400 for completion by a utility company (e.g., by a utility company's singular or distributed computer system). Process 400 is shown to include, from a utility or financing entity of a utility, funding end-user energy efficiency improvements (step 402). The improvements are funded in exchange for an agreement of the end-user to pay for the energy savings over time. Process 400 further includes estimating an energy savings (i.e., the power base load capacity relief) resulting from replacing the old technology with the energy efficient technology (step 404). Before or after the energy efficient installation/retrofit is complete, the utility calculates a return needed for repayment of the energy efficient technology cost (step 406). Process 400 further includes determining a new utility rate by apportioning the return needed for repayment of the technology cost as a function of the estimated base power load capacity relief (step 408). The utility can then generate a utility invoice for sending to a utility consumer (step 410). The utility invoice can include a payment amount for a power reduction over time (e.g., during that billing period) at the new utility rate.

Because the utility company may also be providing electricity at an electricity rate to the end-user, it is important to note that the utility invoice can include two components: a first payment amount based on electricity usage (usage*electricity rate) plus a second payment amount based on energy savings (a power reduction over time*a new utility rate based on the return needed to repay the technology cost). The first payment amount is different than the second payment amount. Said another way, the first payment amount is for electrical energy use and the second payment amount is for electrical energy savings.

Providing and funding a "virtual power plant" as described in, e.g., FIG. 4 can have a number of advantages for a power utility relative to building a new coal plant or other traditional energy source. If traditional power utility plants are built by the utility, significant investment is required. However, if load does not grow such that the additional capacity is needed, then the significant investment is not recovered. Further, the very addition of the additional traditional capacity and its added expense to utility bills could be a reason for slowed demand. By providing a virtual power plant via energy savings, a utility can regain capacity, allowing the utility to stay competitive and meet demand without conducting a significant capital and ongoing outlay for a new plant.

Yet other advantages are associated with the virtual power plant approach to base load relief and peaking relief. For example, due to the distributed nature of the virtual power plant (making energy efficient installations and retrofits), very little regulatory lead-time may be necessary. This allows for real-time, direct benefits. One of these benefits may be environmental improvement. A reduction in energy use is significantly cleaner than the construction and use of a new power plant. Further, virtual power plants are not associated with transmission expenditures, significant operating costs, infrastructure upgrade costs, transmission losses, distribution losses, or other losses typically associated with the business of generating and distributing more electricity.

Entities other than utilities and end-users can finance virtual power plants. For example, a government entity could finance virtual power plants rather than new traditional power plants. The government entity could obtain a return on its investment by using the method outlined, e.g., in FIG. 4.

It should be noted that a single building, campus, or entity may have a plurality of electric lighting fixtures or natural lighting features (e.g., light pipes) and/or that a plurality of light sensors may be distributed in the building environment. The processing electronics of the system may be configured to aggregate information received from the plurality of light sensors in the building environment and to use the aggregated information to determine how many or which of a plurality of electric lighting fixtures to turn off while maintaining target lighting levels in the building environment.

Yet further, it should be noted that the processing electronics described herein may be combined into a single device or distributed into more devices and still be considered "processing electronics" of the present disclosure. For example, as shown in FIG. 3A, the processing electronics may be distributed among a local controller for the electric lights in the building environment and a master controller for controlling the plurality of electric lights and/or their respective controllers. In an exemplary embodiment the system of the present disclosure includes many electric lighting fixtures that are jointly controlled by one or a system of controllers. The reduced energy calculations of the present disclosure, in such an embodiment, may be based off an aggregate displaced energy capacity provided by turning the many lights off or a portion of the many lights off. In one embodiment the aggregate displaced energy may be calculated using a meter at a power inlet for a building. In another embodiment the displaced energy is calculated at the controller or controllers for the plurality of electric lighting fixtures.

The methods described herein may be computer-implemented methods and may be executed by one or more computer systems or electronic systems as described herein. Instructions for causing the computer systems to complete the activities of the above-described methods may be embodied on computer-readable media such as a CDROM, flash drive, or otherwise. All such embodiments of the invention are within the scope of the present disclosure.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more."

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. It should be understood that the present application is not limited to the details or methodology set forth in the description or illustrated in the figures. It should also be understood that the terminology is for the purpose of description only and should not be regarded as limiting.

What is claimed is:

1. A lighting system for displacing energy, comprising:
   a light sensor configured to measure an amount of light provided from a natural lighting fixture to a building environment;
   processing electronics configured to receive information from the light sensor and to use the received information to determine when the amount of light provided from the natural lighting fixture exceeds a first threshold or exceeds a second threshold greater than the first threshold, the processing electronics configured to turn off or dim a first group of one or more electric lighting fixtures in response to the amount of light provided from the natural lighting fixture exceeding the first threshold, the processing electronics configured to turn off or dim the first group of one or more electric lighting fixtures and a second group of one or more electric lighting fixtures in response to the amount of light provided from the natural lighting fixture exceeding the second threshold, the processing electronics causing the one or more electric lighting fixtures to turn off or dim in response to the determination; wherein the processing electronics are further configured to calculate the energy saved from turning off or dimming the one or more lighting fixtures; and
   a communications interface configured to transmit the results of the calculation of energy saved from the processing electronics to a second party for completing a financial transaction.

2. The lighting system of claim 1, wherein the natural lighting fixture is a light pipe for mounting to the building environment and configured to provide light to the interior space.

3. The lighting system of claim 2, wherein the light pipe comprises:
   a reflective tube;
   a diffuser mounted proximate a first end of the reflective tube; and
   a light collection system mounted proximate a second end of the reflective tube, the second end opposite to the first end, the light collection system configured to direct natural light into the reflective tube.

4. The lighting system of claim 3, wherein the diffuser comprises a concave surface configured to face the interior of the building environment.

5. The lighting system of claim 1, wherein the light sensor is mounted to the natural lighting fixture.

6. The lighting system of claim 1, wherein the financial transaction comprises an exchange of the energy saved for a rate discount from a utility company.

7. The lighting system of claim 1, wherein the processing electronics are configured to periodically calculate the financial value of a plurality of rate discounts based on the energy saved and to communicate the calculated financial value to a technology provider.

8. The lighting system of claim 1, wherein the financial transaction comprises a payment corresponding to the energy saved in exchange for a reduction of an amount owed for a technology package comprising at least the natural lighting fixture and the processing electronics.

9. The lighting system of claim 1, wherein the second party is an energy trading exchange and wherein the financial transaction comprises exchanging the energy savings for pollution credits.

10. The lighting system of claim 1, wherein the natural lighting fixture comprises at least one light reflective element and at least one light diffusive element, the light reflective element and the light diffusive element positioned to direct outside light into the building environment.

11. A computerized method for using a lighting system to displace energy, comprising:
   receiving information from a light sensor configured to measure an amount of light provided from a natural lighting fixture to a building environment;
   providing the received information to processing electronics configured to use the received information to determine when the amount of light provided from the natural lighting fixture exceeds a first threshold or exceeds a second threshold greater than the first threshold;
   using the processing electronics to cause an output of a first group of the one or more electric lighting fixtures to reduce in response to a determination that the amount of light provided from the natural lighting fixture exceeds the first threshold;
   using the processing electronics to cause the output of the first group of one or more electric lighting fixtures and an output of a second group of one of more electric lighting fixtures to reduce in response to a determination that the amount of light provided from the natural lighting fixture exceeds the second threshold;
   using the processing electronics to calculate the energy saved from reducing the output of the one or more electric lighting fixtures; and
   communicating results of the calculation of energy saved from the processing electronics to a second party for completing a financial transaction.

12. The computerized method of claim 11, wherein the natural lighting fixture is a light pipe for mounting to the building environment and configured to provide natural light to the interior space of the building environment.

13. The computerized method of claim 12, wherein the light pipe comprises:
   a reflective tube;
   a diffuser mounted proximate a first end of the reflective tube; and
   a light collection system mounted proximate a second end of the reflective tube, the second end opposite to the first end, the light collection system configured to direct natural light into the reflective tube.

14. The computerized method of claim 13, wherein the diffuser comprises a concave surface configured to face the interior of the building environment.

15. The computerized method of claim 11, wherein each of the one or more electric lighting fixtures comprises a plurality of bulbs, and wherein reducing the output of the one or more electric lighting fixtures comprises at least one of:
   (a) turning off half of the bulbs of the one or more electric lighting fixtures; and
   (b) step-dimming the bulbs of the one or more electric lighting fixtures via one or more step-dimming ballasts.

16. The computerized method of claim 11, wherein the financial transaction comprises the energy saved in exchange for a rate discount from a utility company.

17. The computerized method of claim 11, wherein the financial transaction comprises a payment corresponding to the energy saved in exchange for a reduction of an amount owed for a technology package comprising at least the natural lighting fixture and the processing electronics.

18. The computerized method of claim 11, further comprising:
   aggregating received information from a plurality of light sensors in the building environment; and
   using the aggregated information to determine how many electric lighting fixtures to turn off while maintaining target lighting levels in the building environment.

19. A lighting system for displacing energy, comprising:
   a light sensor configured to measure an amount of light provided from a natural lighting fixture to a building environment;
   processing electronics configured to receive information from the light sensor and to use the received information to determine when the amount of light provided from the natural lighting fixture is sufficient to allow one or more electric lighting fixtures to be turned off or dimmed, the processing electronics causing the one or more electric lighting fixtures to turn off or dim in response to the determination; wherein the processing electronics are further configured to calculate the energy saved from turning off or dimming the one or more lighting fixtures; and
   a communications interface configured to:
      transmit the results of the calculation of energy saved from the processing electronics to a second party for completing a financial transaction; and
      receive information identifying a peaking time period from a remote source,
   wherein the processing electronics are configured to check for potential energy displacement in response to the information identifying the peaking time period; and
   wherein the processing electronics conducts the check by comparing the amount of light provided from the natural lighting fixtures of the building environment to a threshold minimum value.

* * * * *